United States Patent
Null et al.

(10) Patent No.: US 9,965,655 B1
(45) Date of Patent: May 8, 2018

(54) PORT SECURITY DEVICE FOR COMPUTING DEVICES AND METHODS OF OPERATING SUCH

(71) Applicant: Erkios Systems, Inc., Kansas City, MO (US)

(72) Inventors: Sean Null, Kansas City, MO (US); Philip Van der Straeten, Kansas City, MO (US)

(73) Assignee: Erkios Systems, Inc., Kansas City, MO (US)

( * ) Notice: Subject to any disclaimer, the term of this patent is extended or adjusted under 35 U.S.C. 154(b) by 11 days.

(21) Appl. No.: 15/490,645

(22) Filed: Apr. 18, 2017

(51) Int. Cl.
*G06F 21/86* (2013.01)

(52) U.S. Cl.
CPC .................................... *G06F 21/86* (2013.01)

(58) Field of Classification Search
None
See application file for complete search history.

(56) References Cited

U.S. PATENT DOCUMENTS

| | | | |
|---|---|---|---|
| 6,032,256 A * | 2/2000 | Bernard | G06F 21/31 726/34 |
| 7,452,239 B2 | 11/2008 | Montena | |
| 7,530,824 B2 | 5/2009 | Bolain | |
| 7,635,272 B2 | 12/2009 | Poppe | |
| 9,460,319 B1 * | 10/2016 | Munns | G06F 21/86 |
| 2003/0167919 A1 * | 9/2003 | Schempf | F17D 3/01 95/15 |
| 2004/0085994 A1 * | 5/2004 | Warren | H04L 12/433 370/462 |
| 2008/0041125 A1 * | 2/2008 | Poppe | H01R 13/6397 70/57 |
| 2011/0207347 A1 * | 8/2011 | Tsuruta | H01R 13/44 439/133 |
| 2011/0294328 A1 * | 12/2011 | Katagiri | B60L 11/1818 439/304 |
| 2014/0016902 A1 * | 1/2014 | Pepe | G02B 6/3893 385/76 |
| 2014/0033774 A1 * | 2/2014 | Ofchus | G07C 9/00571 70/264 |
| 2014/0167915 A1 * | 6/2014 | Tamada | G07C 9/00309 340/5.61 |
| 2015/0020189 A1 * | 1/2015 | Soffer | G06F 21/85 726/16 |
| 2015/0186685 A1 * | 7/2015 | Vroom | G06F 1/1632 726/35 |

(Continued)

FOREIGN PATENT DOCUMENTS

WO 2008030353 A3 5/2008

*Primary Examiner* — Trang Doan
(74) *Attorney, Agent, or Firm* — Armstrong Teasdale LLP

(57) ABSTRACT

A system includes a first computing device and a second computing device. The first computing device includes a port. The second computing device is configured to communicate with the first computing device. The system also includes a port security device configured to restrict access to the port. The port security device includes a transceiver configured to communicate with a third computing device. The third computing device is configured to determine a status of the port security device. At least one of the port security device and the third computing device includes a user interface configured to provide an indication of the status of the port security device.

24 Claims, 3 Drawing Sheets

(56) References Cited

U.S. PATENT DOCUMENTS

| | | | |
|---|---|---|---|
| 2015/0194829 A1* | 7/2015 | Smeja | H02J 7/0042 |
| | | | 320/107 |
| 2015/0264784 A1* | 9/2015 | Romano | H05B 37/0272 |
| | | | 315/158 |
| 2016/0012260 A1* | 1/2016 | Fowler | G06F 21/82 |
| | | | 726/35 |
| 2017/0053467 A1* | 2/2017 | Meganck | G07C 9/00039 |
| 2017/0109547 A1* | 4/2017 | Munns | G06F 21/83 |
| 2017/0138763 A1* | 5/2017 | Szeto | G01D 5/145 |

* cited by examiner

PORT SECURITY DEVICE FOR COMPUTING DEVICES AND METHODS OF OPERATING SUCH

FIELD

The field of the disclosure relates generally to security devices for computing devices. More particularly, this disclosure relates to a security device for a port of a computing device.

BACKGROUND

At least some computing devices include at least one port that is configured to receive a cable or other data transfer component. However, the port may allow unauthorized users to access the device and other devices. Accordingly, at least some computing devices include a controller configured to selectively disable the port. However, an unauthorized user may use the computing device to activate the port and, thereby, gain access to the interconnected devices. Accordingly, at least some computing devices include a blocking mechanism inserted into the port to restrict access. However, an unauthorized user may be able to remove and/or disable the mechanism without immediate detection. At least some known blocking mechanisms may include a seal or tamper tape that is broken when the blocking mechanism has been tampered with. However, such mechanisms rely on a person in the vicinity of the device to inspect the mechanisms to determine if tampering has occurred and do not provide real-time indications of tampering to an administrator. Accordingly, tampering may be unobserved and the interconnected devices may be vulnerable to unauthorized users for a prolonged period of time. Moreover, such manual inspections may be prone to misinterpretation and false positives.

Therefore, there is a need for security devices for ports of a computing device that inhibit unauthorized access and provide an alarm if an unauthorized user attempts to access the computing device.

BRIEF DESCRIPTION

In one aspect, a system includes a first computing device and a second computing device. The first computing device includes a port. The second computing device is configured to communicate with the first computing device. The system also includes a port security device configured to restrict access to the port. The port security device includes a transceiver configured to communicate with a third computing device. The third computing device is configured to determine a status of the port security device. At least one of the port security device and the third computing device includes a user interface configured to provide an indication of the status of the port security device.

In another aspect, a port security device for use with a computing device includes a housing configured to move relative to a plug positioned in a port of the computing device. The port security device is positionable between a locked position in which the housing inhibits access to the port and an unlocked position in which the housing allows access to the port. The port security device also includes a sensor configured to detect when the port security device moves between the locked position and the unlocked position.

In yet another aspect, a method of securing a port of an interconnected computing device includes providing a port security device configured to connect to the interconnected computing device adjacent the port. The port security device includes a housing. The port security device is positionable between a locked position in which the housing inhibits access to the port and an unlocked position in which the housing allows access to the port. The method also includes detecting, using a sensor, when the port security device moves between the locked position and the unlocked position. The method further includes sending a signal to an access point when the sensor detects that the port security device moves between the locked position and the unlocked position.

BRIEF DESCRIPTION OF THE DRAWINGS

Corresponding reference characters indicate corresponding parts throughout the several views of the drawings.

DETAILED DESCRIPTION

Figure 1:
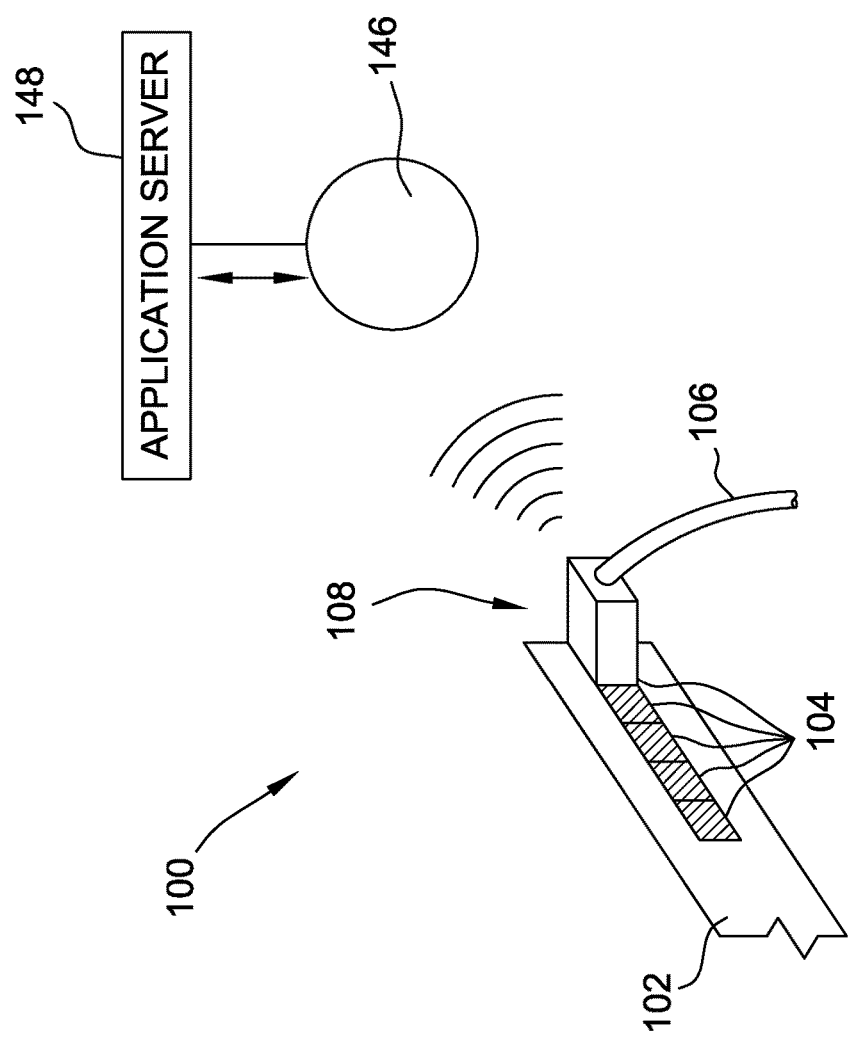
FIG. 1 is a schematic view of a system including interconnected devices.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments described herein inhibit unauthorized access to systems. For example, a port security device is configured to obstruct a port of the system and provide an indication when someone attempts to remove the port security device without authorization. The port security device has an unlocked position and a locked position. In the unlocked position, the port security device is able to be removed from the port. In the locked position, the security device is inhibited from being removed from the port and the port security device prevents objects from being positioned in the port. In addition, in some embodiments, the port security device provides an indication when the port security device is moved between the locked position and the unlocked position and/or when a person attempts to access the port. In some embodiments, the port security device includes a sensor, an internal power supply, a controller, a transceiver, and an alarm. The sensor is configured to detect when the port security device is displaced and send a signal to the controller. The controller is configured to exchange signals with an application server using the transceiver and to provide active indications in real-time to an operator when the sensor detects displacement of the port security device.

As a result, the port security device provides increased security against system threats due to physical access to interconnected devices. In addition, the port security device operates at the physical location of the potential vulnerability to provide direct protection. Moreover, the port security device is configured to work with an access monitoring system that is external to the system to provide reliable cyber security logging, monitoring, alerting, and/or compliance functionality.

Referring now to the drawings and in particular to FIG. 1, one embodiment of a system is designated in its entirety by the reference number 100. In suitable embodiments, the system 100 may include at least one device that includes at least one electrical component. In the illustrated embodiment, the system 100 includes an interconnected computing device 102 such as a personal computer, a switch, a router, a server, a communication component, a handheld electronic device, and/or an appliance. The interconnected computing device 102 includes a plurality of input/outputs, broadly ports, 104. The ports 104 may be used as inputs and/or outputs and configured to receive, for example and without limitation, a cable 106, a data storage device (not shown), a wireless networking device (not shown), D-sub combination (DB) class connectors such as DB9 and DB25 connectors, and/or registered jack (RJ) class connectors such as RJ45 and RJ11 connectors. For example, the ports 104 may include, without limitation, Universal Serial Bus (USB) ports, serial ports, parallel ports, video graphics array (VGA) ports, Firewire ports, sockets, Ethernet ports, personal system (PS)/2 ports, digital video interface (DVI) ports, and recommended standard (RS) or Electronic Industries Alliance class ports such as RS-232 ports. Ports 104 may be used for network connectivity, console commands, removable media, or input/output devices. Accordingly, the ports 104 may allow access to the interconnected computing device 102 and/or allow the interconnected computing device 102 to communicate with other interconnected computing devices 102. In other embodiments, the interconnected computing device 102 may include any port 104 that enables the interconnected computing device 102 to operate as described herein.

A port security device 108 is configured to obstruct at least one of the ports 104 of the system 100. In the illustrated embodiment, the port security device 108 protects a single port 104. In other embodiments, the port security devices 108 may protect any of the ports 104. For example, in some embodiments, a single port security device 108 may be used to protect multiple ports 104. The port security devices 108 may be used for ports 104 connected to the cable 106 and/or empty ports 104. In some embodiments, the port security device 108 may be used with any device including ports 104 and not necessarily with the interconnected computing device 102 shown in FIG. 1. For example, the port security device 108 may be used with a device including at least one electronic component and at least one port. In some embodiments, the port security device 108 may be used with a device not connected to a network.

The cable 106 includes a plug 110 (shown in FIG. 2) that is configured to extend into and engage the port 104. The cable 106 extends from the port 104 and through the port security device towards a server or other suitable device. Accordingly, the cable 106 provides a physical connection to a network to allow the interconnected computing device 102 to communicate on network infrastructures including, for example and without limitation, industrial control systems, cloud infrastructures, enterprise environments, and the internet. In other embodiments, the system 100 may include a computing device not connected to a network. For example, in some embodiments, the computing device 102 may be a stand-alone device such as a consumer appliance and/or a computing device configured for wireless communication.

Figure 2:
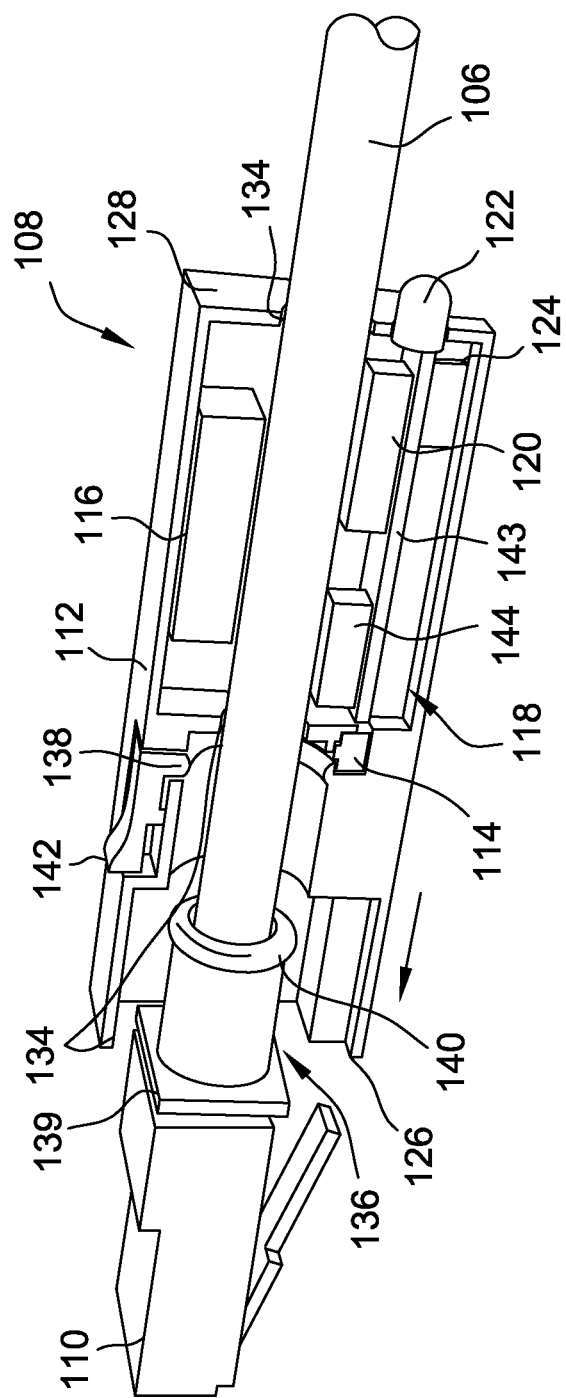
FIG. 2 is a sectional view of a port security device in an unlocked position.
Figure 3:
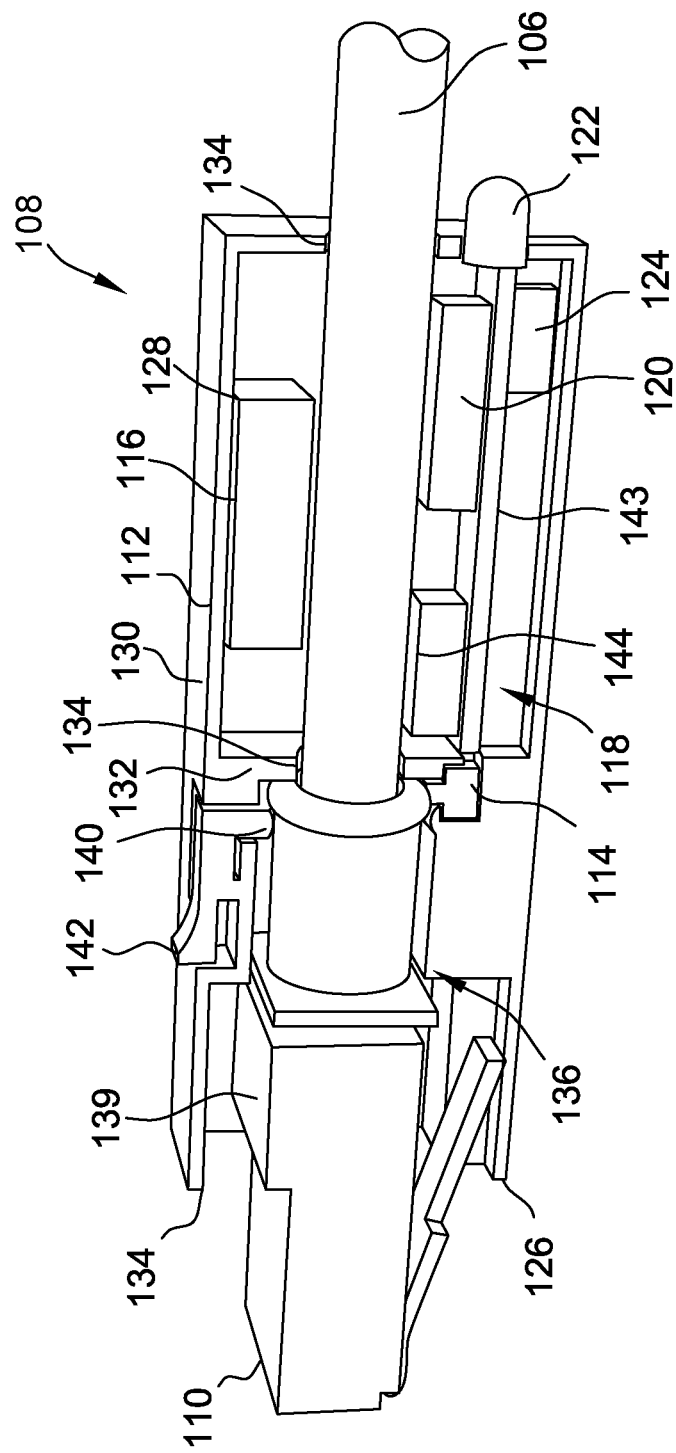
FIG. 3 is a sectional view of a port security device in a locked position.

As shown in FIG. 2, the port security device 108 is configured to connect to the cable 106 and allow the cable 106 to be connected to the port 104 (shown in FIG. 1). FIG. 2 shows the port security device 108 connected to the cable 106 and in an unlocked position. FIG. 3 shows the port security device 108 connected to the cable 106 and in a locked position. In the unlocked position, the port security device 108 allows the cable 106 to be removed from the port 104. In the locked position, the port security device 108 inhibits the cable 106 from being removed from the port 104 and prevents objects from being positioned in the port 104. In other embodiments, the port security device 108 may be configured to connect to the port 104 without the cable 106. For example, in some embodiments, the port security device 108 includes the plug 110 configured to extend into the port 104.

The port security device 108 includes a housing 112, a sensor 114, an internal power source 116, a controller 118, a transceiver 120, a light, broadly an alarm, 122, and a speaker, broadly an alarm, 124. In alternative embodiments, the system 100 may include any suitable components that enable the port security device 108 to function as described herein. In some embodiments, at least some components of the port security device 108, such as the sensor 114 and/or the transceiver 120, may be incorporated into the cable 106 and/or the interconnected computing device 102.

The housing 112 is configured to at least partially enclose and protect internal components of the system 100 such as the sensor 114, the power source 116, the controller 118, the transceiver 120, the light 122, and the speaker 124. The power source 116, the controller 118, the transceiver 120, and the speaker 124 are positioned within an interior space of the housing 112. The light 122 extends at least partially on an exterior of the housing 112 such that the light 122 may be visible on the exterior of the housing 112. The housing 112 includes a first end 126, a second end 128, and a sidewall 130 extending between the first end 126 and the second end 128. In addition, a partition 132 is positioned intermediate the first end 126 and the second end 128 and divides the interior space of the housing 112. The partition 132, the second end 128, and the sidewall 130 prevent objects on the exterior of housing 112 from contacting the controller 118, the transceiver 120, and the speaker 124. The first end 126, the second end 128, and the partition 132 define openings 134 configured to receive the cable 106 such that the cable 106 extends through the interior space of the housing 112 and the housing 112 extends about the cable 106. The housing 112 is configured to cover the plug 110 and prevent the cable 106 and the plug 110 from being disconnected from the port 104 when the port security device 108 is in the locked position. In alternative embodiments, the port security device 108 may include any housing 112 that enables the port security device 108 to function as described herein. For example, in some embodiments, the housing 112 and the plug 110 are connected in assembly and the port security device 108 is configured to connect to the port 104 without the cable 106 being connected to the port 104.

In suitable embodiments, the housing 112 may be assembled in any manner and with any materials that enable the housing 112 to function as described herein. For example, in some embodiments, the housing 112 may be constructed of resilient materials such as plastics and/or metals. Suitably, the housing 112 and the cable 106 are configured to prevent removal of the housing 112 from the cable 106. For example, in some embodiments, the housing 112 and the cable 106 may be assembled as a single unit. In other embodiments, the housing 112 may be assembled separately and connected to a cable 106 to allow the port security device 108 to be retrofitted to a cable 106 installed in a port 104. For example, the housing 112 may be assembled from multiple parts that connect together and capture the cable 106 to form a permanent assembly. In further embodiments, the plug 110 may be at least temporarily removed to allow the housing 112 to slide onto the cable 106. In further embodiments, the housing 112 includes a hinge to facilitate the housing 112 capturing the cable 106 between two hinged portions. In addition, in some embodiments, the housing 112 includes a locking mechanism to secure the housing 112 to the cable 106. For example, in some embodiments, the housing 112 may include, without limitation, a clamp, a padlock, a bolt, a cam, a lever, a keyed opening, magnets, and any other suitable locking feature.

The port security device 108 includes a collar 136 configured to connect to the cable 106 adjacent the plug 110 and engage the housing 112. In particular, when the port security device 108 is in the locked position, the collar 136 engages a lock 138 of the housing 112. The collar 136 has an annular shape and is configured to extend about the cable 106. The collar 136 includes a plate 139 configured to contact the plug 110 and a rim 140 opposite the plate 139. The lock 138 extends from the housing 112 and is configured to contact the rim 140. The lock 138 is displaceable to allow the rim 140 to pass the lock 138 when the port security device 108 moves from the unlocked position to the locked position. When the port security device 108 is in the locked position, the lock 138 contacts the rim 140 and prevents separation of the housing 112 and the collar 136. A release 142 may be actuated to displace the lock 138 and allow the port security device 108 to be moved from the locked position to the unlocked position. In some embodiments, a tool corresponding to the port security device 108 may be required to actuate the release 142. In alternative embodiments, the port security device 108 may include any locking mechanism that enables the port security device 108 to operate as described herein. For example, in some embodiments, the port security device 108 may include, without limitation, a clamp, a padlock, a bolt, a cam, a lever, a keyed opening, magnets, and any other suitable locking feature.

In suitable embodiments, the collar 136 may be attached to the plug 110 in any manner. For example, the collar 136 and the plug 110 may be attached using adhesives, welds, fasteners, locking features, and any other suitable attachment means. In the illustrated embodiment, the collar 136 is permanently attached to the plug 110. Accordingly, the collar 136 prevents movement of the housing 112 relative to the plug 110 when the port security device 108 is in the locked position. In alternative embodiments, the collar 136 may be omitted and the housing 112 may directly engage the plug 110.

The sensor 114 is configured to detect a position of the port security device 108 relative to the cable 106 and/or the port 104. The port security device 108 may include any suitable sensor. For example, in some embodiments, the port security device includes, without limitation, a contact sensor, a capacitive sensor, an optical sensor, an accelerometer, and an acoustic sensor. In the illustrated embodiment, the sensor 114 includes a pressure sensor that detects when the collar 132 has engaged the housing 112.

The sensor 114 sends a signal to the controller 118 when the port security device 108 moves relative to the cable 106 and/or the port 104. As a result, the controller 118 may determine when the port security device 108 has been tampered with and/or removed from the cable 106 and/or the port 104. The controller 118 may activate the speaker 124, the light 122, and/or the transceiver 120 to provide an indication to a system administrator and/or other suitable persons when the port security device 108 has been tampered with and/or removed from the cable 106 and/or the port 104. For example, the speaker 124 and the light 122 may be configured to provide an alarm for people in the vicinity of the interconnected computing device 102. Accordingly, such alarms or active signals may deter unauthorized users. In addition, the alarms are configured to attract attention and reduce the possibility of people not observing and/or ignoring the indication of tampering. In contrast, at least some known tamper indicators are passive and require a person to inspect a tamper indicator and determine if tampering has occurred. In alternative embodiments, the port security device 108 may include any suitable alarm. For example, in some embodiments, the port security device 108 and/or the controller 118 may be configured to send a notification such as a text message, email, telephone call, and/or other communication to a user.

The controller 118 includes a control board 143 and a plurality of electronic components mounted on the control board. For example, in the illustrated embodiment, an electrical current sensor 144 and the transceiver 120 are mounted on the control board 143. The electronic components may be connected by a circuit and receive power from the power source 116. In the exemplary embodiment, the controller 118 is a programmable logic controller (PLC). In alternative embodiments, the port security device 108 may include any controller 118 that enables the port security device 108 to operate as described herein.

The electrical current sensor 144 may detect transmission of signals through the cable 106. Accordingly, the port security device 108 may be used to monitor usage of the port 104. For example, the port security device 108 may provide an alarm if the port security device 108 detects transmission of signals through the cable 106 when the port 104 has been previously disabled.

In reference to FIGS. 1 and 2, the transceiver 120 is configured to exchange signals with at least one other electronic device. For example, the transceiver 120 may enable the port security device 108 to communicate using one or more wireless communication systems. The transceiver 120 may utilize electromagnetic waves, acoustic frequencies, visual signals, and/or any suitable communication signal. The transceiver 120 may send the signal to the access point 146, a relay, and/or any other suitable component. In some embodiments, the system 100 may communicate through a wired connection in addition to and/or in place of a wireless connection. For example, in some embodiments, the transceiver 120 is connected to a cable extending from the housing 112 and configured to provide a wired connection between the port security device 108, the access point 146, and/or a remote computing device. In further embodiments, a plurality of the port security devices 108 may be connected together in assembly by a wired connection and the assembly may communicate information with a remote computing device. In some embodiments, the transceiver 120 is incorporated into a separate housing connected to the assembly of port security devices 108. In alternative embodiments, the port security device 108 may include any communication component that enables the port security device 108 to operate as described herein. In some embodiments, the transceiver 120 may be omitted or selectively turned off and the port security device 108 may be configured to not communicate with other devices, i.e., the port security device 108 may operate "off the grid."

Accordingly, the transceiver 120 allows the port security device 108 to communicate with an access point 146 and an application server, broadly a computing device, 148 remote from the port security device 108 and the interconnected computing device 102. The access point 146 provides a connection between the transceiver 120 and the application server 148 to allow communication between the transceiver and the application server. In some embodiments, the access point 146 may be a separate computing device or incorporated into the application server 148. Suitably, the transceiver 120 and the application server 148 communicate on a network that excludes the interconnected computing device 102. In other words, the interconnected computing device 102 may communicate on a first network and the port security device 108 may communicate on a second network such that the application server 148 and the port security device 108 are out-of-band of the interconnected computing device 102. As a result, an unauthorized user cannot control the port security device 108 from the interconnected computing device 102. In contrast, at least some known computing devices rely on a controller and/or programming on the computing device itself to provide security for ports. As a result, in the known computing devices, an unauthorized user may deactivate security measures at the computing device itself or at other devices on the same network. Accordingly, such internal programming measures have provided a false sense of security and have prevented persons from recognizing the vulnerability of the ports 104. In contrast, the port security device 108 described herein is controlled separately and may be isolated from the interconnected computing device 102 and other devices on the same network. In suitable embodiments, the port security device 108 may be incorporated into a standalone security system and/or may be integrated into Security Information Event Monitoring (STEM) infrastructure.

In addition, the port security device 108 is configured to provide data relating to the operational status of the port security device 108 and/or the port 104. Accordingly, the port security device 108 allows monitoring and/or logging of operation of the system 100. For example, the port security device 108 may transmit and/or store information relating to an operational status of the port security device 108 and/or the port 104. In some embodiments, the port security device 108 may transmit information at regular intervals and/or respond to requests for information from remote computing devices. The operational status may include power levels, activity data, diagnostic data, communication data, sensor status, alerts, inputs, outputs, and any other operational data. In alternative embodiments, the port security device 108 may store and/or transmit any information that enables the system 100 to operate as described herein.

In some embodiments, the port security device 108 may include a user interface configured to receive inputs from a user and to display information to the user. In the exemplary embodiment, the port security device 108 includes the light 122 which provides a visual indication to the user of a status of the port security device 108. For example, in some embodiments, the light 122 may be activated when the housing 112 is displaced. In further embodiments, the light 122 may change colors to display different operational states of the port security device 108. In alternative embodiments, the system may include any user interface that enables the port security device 108 to operate as described herein. For example, in some embodiments, the port security device 108 may include, without limitation, a touch screen, a display screen, a keyboard, a light, a speaker, a joystick, a computer mouse, a scroll ball, a microphone, a camera, a sensor, and any other suitable user interface component. In some embodiments, the user interface may be incorporated into the application server 148.

In addition, as shown in FIGS. 2 and 3, the power source 116 is sized to fit within the housing 112. In particular, in the illustrated embodiment, the power source 116 is completely enclosed in the housing 112. Accordingly, the housing 112 and the power source 116 are configured to prevent tampering with the power source 116. In some embodiments, a portion of the power source 116, such as an input/output connector, may extend to the exterior of the housing 112. The power source 116 allows the port security device 108 to have a compact and portable configuration because the power source 116 is within the housing 112. In alternative embodiments, the power source 116 may be removable from other components of the system 100. In further embodiments, the power source 116 may be positioned in a second housing (not shown) that is positioned within and/or attached to the housing 112. In some embodiments, the port security device 108 may draw at least some power from an external power supply such as the port 104. In such embodiments, the power source 116 may be omitted.

In reference to FIGS. 1 and 2, during operation, the housing 112 of the port security device 108 is coupled about the cable 106 such that the housing 112 is movable along the cable 106 relative to the plug 110 of the cable 106. To move the port security device 108 into the locked position, the housing 112 is moved toward the port 104 until the housing 112 covers the port 104 and the plug 110. The lock 138 engages the collar 136 to secure the housing 112 in position relative to the plug 110 and the port 104. Accordingly, in the locked position, the port security device 108 prevents access to the port 104. In addition, the port security device detects if a user attempts to displace the housing 112. For example, the sensor 114 is configured to detect when the port security device 108 moves between the locked position and the unlocked position. In some embodiments, the sensor 144 is configured to detect transmission of a signal through the port 104 and/or the cable 106. In some embodiments, the port security device 108 provides an alarm and/or transmits a signal to the access point 146 when the sensor 144 detects movement of the port security device 108.

The access point 146 is configured to receive signals from the port security device 108 and determine a status of the port security device 108. In addition, the application server 148 and/or the access point 146 may be configured to send a signal to the port security device 108 to at least partially disable the port security device 108 and allow removal of the port security device 108. In some embodiments, the port security device 108 may be inactive, i.e., in a sleep mode, when the port security device 108 remains in the locked position and activates when the sensor 114 detects movement and/or when the port security device 108 receives a signal from the access point 146. In such embodiments, the access point 146 may be configured to periodically send signals to the port security device 108, i.e., ping the port security device 108, to check the status. In addition, a computing device connected to the access point 146, such as the application server 148, may be configured to provide an indication to the operator if the access point 146 does not receive a signal or response from the port security device 108.

The port security device 108 provides increased protection of systems by inhibiting access to interconnected computing devices through ports. Accordingly, the port security device 108 may facilitate compliance with regulatory standards issued by organizations such as the North American Electric Reliability Corporation (NERC). For example, the port security device 108 is configured to facilitate compliance with NERC's Critical Infrastructure Protection (CIP) Standard CIP-007-6 R1.2, which requires protection against the use of unnecessary physical input/output ports used for network connectivity, console commands, or removable media.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense. Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system including:
a first computing device including a port;
a second computing device configured to communicate on a first network with the first computing device;
a port security device configured to restrict access to the port and allow monitoring of the port, wherein the port security device includes a transceiver configured to communicate with a third computing device, wherein the third computing device is configured to determine a status of the port security device, and wherein at least one of the port security device and the third computing device includes a user interface configured to provide an indication of the status of the port security device; and
an access point configured to receive a signal from the port security device when the status of the port security device changes, wherein the access point is configured to communicate with the third computing device to allow monitoring of the status of the port,
wherein the access point, the third computing device, and the port security device are out-of-band of the first computing device and communicate on a second network isolated from the first network to prevent the first computing device accessing communications between the port security device, the access point, and the third computing device and to prevent a user from controlling the port security device from the first computing device.

2. The system in accordance with claim 1, wherein the port security device includes a housing and is positionable between a locked position in which the housing inhibits access to the port and an unlocked position in which the housing allows access to the port, wherein the transceiver is configured to send a signal to the third computing device when the port security device moves between the locked position and the unlocked position.

3. The system in accordance with claim 2 further comprising a cable connected to the port, wherein the port security device is configured to receive the cable within an interior space of the housing, wherein the port security device further comprises a current sensor configured to detect if a signal is transmitted through the cable.

4. The system in accordance with claim 2, wherein the port security device includes a power source located in an interior space of the housing and configured to provide power to the transceiver.

5. The system in accordance with claim 2, wherein the port security device is configured to receive power from an external power source.

6. The system in accordance with claim 2, wherein the port security device includes a sensor configured to detect when the housing moves between the locked position and the unlocked position.

7. The system in accordance with claim 2, wherein the port security device is further configured to provide an alarm when the port security device is moved between the locked position and the unlocked position.

8. The system in accordance with claim 2 further comprising a plug configured to extend into the port, wherein the housing is spaced from the plug when the port security device is in the unlocked position, and wherein the housing is secured to the plug when the housing is in the locked position.

9. The system in accordance with claim 1, wherein the port security device is configured to send a signal to the third computing device relating to an operational status of the port security device.

10. The system in accordance with claim 1 further a cable connecting the port security device and the third computing device to allow the transceiver and the third computing device to communicate using a wired connection.

11. A port security device for use with a first computing device that communicates on a first network, the port security device comprising:
   a plug positionable in a port of the first computing device;
   a housing configured to restrict access to the plug when the plug is positioned in the port of the first computing device, wherein the port security device is positionable between a locked position in which the housing inhibits access to the port and an unlocked position in which the housing allows access to the port, the plug being accessible and removable from the port when the port security device is in the unlocked position;
   a sensor configured to detect when the port security device moves between the locked position and the unlocked position; and
   a transceiver configured to send a signal to an access point when the port security device moves between the locked position and the unlocked position, wherein the access point is configured to communicate with a second computing device to allow monitoring of the status of the port, wherein the access point, the second computing device, and the port security device are out-of-band of the first computing device and communicate on a second network isolated from the first network to prevent the first computing device accessing communications between the port security device, the access point, and the second computing device and to prevent a user from controlling the port security device from the first computing device.

12. The port security device in accordance with claim 11 further comprising a power source disposed within an interior space of the housing and configured to provide power to the sensor.

13. The port security device in accordance with claim 11, wherein the housing defines an interior space and includes a first end and a second end, and wherein the housing is configured to receive a cable connected to the port, the cable extending through the interior space from the first end to the second end, the plug being connected to the cable.

14. The port security device in accordance with claim 13, wherein the housing includes a sidewall extending about the cable, the sidewall defining an opening on each of the first end and the second end for the cable to extend through.

15. The port security device in accordance with claim 13 further comprising a lock configured to secure the housing in the locked position.

16. The port security device in accordance with claim 15 further comprising a collar configured to attach to the cable and engage the lock when the port security device is in the locked position.

17. The port security device in accordance with claim 11, wherein the plug and the housing are connected in assembly, and wherein the port security device is configured to connect to the port without a cable being connected to the port.

18. The port security device in accordance with claim 17, wherein the housing is spaced from the plug when the port security device is in the unlocked position.

19. A method of securing a port of an interconnected computing device that communicates on a first network, the method comprising:
   providing a port security device configured to connect to the interconnected computing device adjacent the port, the port security device including a housing, wherein the port security device is positionable between a locked position in which the housing inhibits access to the port and an unlocked position in which the housing allows access to the port;
   detecting, using a sensor, when the port security device moves between the locked position and the unlocked position; and
   sending a signal to an access point when the sensor detects that the port security device moves between the locked position and the unlocked position, wherein the access point is configured to communicate with a computing device remote from the interconnected computing device to allow monitoring of the status of the port, wherein the remote computing device, the access point, and the port security device are out-of-band of the interconnected computing device and communicate on a second network isolated from the first network to prevent the interconnected computing device accessing communications between the port security device, the access point, and the remote computing device and to prevent a user from controlling the port security device from the interconnected computing device.

20. The method in accordance with claim 19 further comprising providing an alarm when the port security device moves between the locked position and the unlocked position.

21. The method in accordance with claim 19 further comprising connecting the port security device to the interconnected computing device adjacent the port and positioning the port security device in the locked position to prevent access to the port.

22. The method in accordance with claim 19 further comprising detecting transmission of a signal through a cable connected to the port.

23. The method in accordance with claim 19 further comprising receiving, the signal from the port security device at an application server connected to the access point, and determining a status of the port security device using the application server.

24. The system in accordance with claim 1, wherein the port security device and the third computing device are configured to communicate using a wireless communication system.

* * * * *